United States Patent [19]

Hayes

[11] Patent Number: 5,319,070

[45] Date of Patent: Jun. 7, 1994

[54] PROCESS FOR REMOVAL OF ASH FROM POLY(VINYL ALCOHOL) POLYMERS

[75] Inventor: Richard A. Hayes, Houston, Tex.

[73] Assignee: E. I. Du Pont de Nemours and Company, Wilmington, Del.

[21] Appl. No.: 71,082

[22] Filed: Jun. 4, 1993

[51] Int. Cl.$^5$ ............................................. C08F 6/08
[52] U.S. Cl. .................................................. 528/482
[58] Field of Search ................. 528/482; 524/379, 557

[56] References Cited

U.S. PATENT DOCUMENTS

| | | | |
|---|---|---|---|
| 2,642,419 | 6/1953 | Waugh et al. | 260/91.3 |
| 2,940,948 | 6/1960 | Halbig et al. | 260/29.6 |

Primary Examiner—Joseph L. Schofer
Assistant Examiner—Tom Weber
Attorney, Agent, or Firm—Peter A. Fowell

[57] ABSTRACT

Metallic, ash-producing residues which remain in poly(vinyl alcohol) polymer after its preparation by hydrolysis of poly(vinyl acetate) are removed by a process which involves contacting a slurry of the poly(vinyl alcohol) polymer with ion-exchange resin particles, followed by removal of the ion-exchange resin particles from the poly(vinyl alcohol) polymer particles utilizing size or weight differences between them. The poly(vinyl alcohol) polymer remains in the solid state throughout, avoiding dissolution and the need for reprecipitation.

7 Claims, No Drawings

PROCESS FOR REMOVAL OF ASH FROM POLY(VINYL ALCOHOL) POLYMERS

BACKGROUND OF THE INVENTION

1. Field of the Invention

This invention relates to a process for removing metallic-salt, ash-producing residues from poly(vinyl alcohol) polymers. More particularly, it relates to a slurry process which utilizes an ion-exchange resin to separate the ash-producing residues from the polymer.

2. Description of Related Art

Poly(vinyl alcohol) homopolymer and poly(vinyl alcohol) coploymers, (collectively referred to hereinafter as poly(vinyl alcohol) polymer, or by the abbreviation PVA) are produced from the corresponding poly(vinyl acetate) homopolymer and poly(vinyl acetate) copolymers by acid or base catalysis. The process may be catalyzed by either strong acids or strong bases, and is known as saponification, hydrolysis or alcoholysis, depending on the catalyst. Base catalysis is generally preferred due to greater efficiency and reaction rate. Unfortunately, any unremoved remaining base tends to destabilize the PVA.

Bases are difficult to wash out of PVA completely, since they tend to be quite strongly absorbed. Base instability may be countered by neutralization of any trace base remaining using weak acids. This produces weakly basic salts such as sodium acetate which are somewhat more amenable to washing out. Such salts themselves, while less destabilizing are, however, still somewhat destabilizing, particularly vis a vis recent more demanding uses of PVA. In addition they are ash precursors, in that ash results on subsequent thermal processing of PVA derived products. (Ash, as used here, is the oxide, hydroxide or related complex that results from heating such salts).

Acid catalysis, does not, of course, result in metallic residues. However, trace acid also destabilizes PVA. Trace acid is also more difficult to wash out than salts. Bases may be used to neutralize the trace acid. Once again however, metal salts will remain.

Residual salts, which can amount to up to 1 weight percent, in addition to producing thermal and color stability problems, albeit less than base itself, lead to ash which has its own associated problems. In transparent PVA derived products, such as butyrated poly(vinyl alcohol) or poly(vinyl butyral), which is used as a windshield interlayer, ash produces haze at levels above about 0.2 weight percent, and even below this level, can affect weatherability. There is therefore a strong incentive to reduce ash-producing residues in PVA to very low levels.

The water-soluble ash precursors, the metal salts, can be removed by extensive washing with water or other solvents, as taught in U.S. Pat. No. 2,642,419. However low salt levels are only achieved by the use of large amounts of solvent, which is inefficient.

Ion-exchange resins (IERs) are known in the removal of metal salts from PVA. However, their use has involved solution of the PVA. U.S. Pat. No. 2,940,948 discloses a process where the PVA and salts are dissolved in water, and the metal cations removed with an acidic, cationic IER. Solid PVA must then be regenerated from the PVA solution.

It would be highly desirable to have a process to remove ash-precursor metal salts by an economical process which involved neither use of large amounts of solvent, nor the need to dissolve and reprecipitate the PVA.

SUMMARY OF THE INVENTION

The invention is a process for removal of residual metal salts from PVA, comprising the steps of:

a) forming a slurry of PVA particles and a slurry-liquid;

b) adding a particulate cationic ion-exchange resin to the slurry, wherein the average particulate size or weight of the ion-exchange resin is substantially different from the average particulate size or weight of the PVA;

c) agitating the combined slurry and ion-exchange resin mixture for a time sufficient to effect at least 20 percent ion exchange;

d) optionally removing the slurry-liquid, and drying, and e) removing the particulate ion-exchange resin from the particulate PVA by differential-particle separation means.

DETAILED DESCRIPTION OF THE INVENTION

The invention involves the use of cationic IERs to remove residual metal salts by exchange of the metal ions, using a slurry of the PVA mixed with the IER. The slurry-liquid acts as a medium for the exchange. A substantial portion of the original PVA is recovered, free of IER, from the slurry mix using differential particle separation techniques. The residual metal salt content can be reduced to very low levels, for instance, below 20% of the PVA's as-prepared residual salt level. The process is also applicable when only moderate reduction of salt level, say 50%, is required. The key to the invention is the recognition that solution of the PVA is not necessary for adequate metal ion removal by exchange, and that certain liquids or liquid mixes exist which are essentially non-solvents for the PVA but which have at least minor solubility for the metal salts to be removed, and can be used in the form of a slurry medium with the PVA and act as adequate ion-exchange media for salt removal.

There are two quite distinct requirements for the IER. One is purely physical; the average size or weight of the IER particles relative to those of the PVA. The other is chemical or physico-chemical and relates to how rapidly ion exchange can take place.

In the exchange, the metal cations become preferentially associated with the strong acid anions which form part of the IER. The process is applicable particularly to weak acid salts, such as sodium acetate, which is the most common salt left after hydrolysis. The process is also be applicable to salts of stronger acids such as sodium sulfate. The acid anions in the IER should be equal, but preferably more strongly acid than those of the metal salt. Efficiency, in terms of rate and equilibrium exchange achievable, will clearly depend on relative acidities of the anion in the IER and that of the salt.

Chemically, the IERs used in the process of this invention are acid containing cationic type resins. Many cation IERs are known in the art. They are typically polystyrene or polyacrylic resins containing an acid functionality either by post reaction or by copolymerization, and crosslinked, typically with a polyvinyl monomer such as divinyl benzene or a dimethacrylate. They may also be acid functionality containining, crosslinked cellulosic resins. The acid anions are typically carboxylic, sulfonic or phosphoric. Many such resins are available commercially.

The rate of ion exchange will also depend on the amount of acid anions present, and on physical factors such as porosity, and solvent permeability or absorbability of the IER. It is not essential to have a detailed knowledge of the relation between these various factors. Suitable resins may readily be selected by a minimum amount of testing. The resins employed in the testing described below were quite adequate. No attempt was made to further optimize the IER composition and physico-chemical characteristics.

Poly(vinyl alcohol) polymers, or PVA, comprise a large family of poly(vinyl alcohol) hompolymers and copolymers. These polymers are prepared by the partial or essentially complete saponification, hydrolysis or alcoholysis of the corresponding poly(vinyl acetate) polymer. (for convenience, the general term 'hydrolysis' will be used hereinafter, even though it may not be strictly correct). Hydrolysis of anywhere from about 50 to 99 percent of the acetate groups to hydroxyl groups may produce products referred to as poly(vinyl alcohol) polymer. Generally however, 80 percent and above, and usually above 90 percent are hydrolyzed.

Many comonomers are used in PVAs. The amount of comonomer can be up to about 20 weight percent. Above this, many of the characteristic features of PVA begin to diminish. Comonomers which can be used include acrylic, methacrylic, maleic, fumaric and crotonic acids, and their metal salts and alkyl esters. Polyethylene glycol and polypropylene glycol esters with the above acids are also possible. Vinyl chloride and tetrafluoroethylene can also be comonomers. Preferred comonomers include the lower alkyl acrylates and methacrylates. The process of the present invention is applicable to, but not limited to, all of the above copolymers.

The slurry-liquid must have certain characteristics. Ideally it should be a non-solvent for the PVA and a solvent or partial-solvent for the metal salt to be removed, at the slurry temperature used. Preferably however, it must not dissolve more than 10 weight percent of the PVA, and more preferably even less. In a batch process, any solution of PVA will involve a yield loss, unless expensive reprecipitation is used to recover the PVA. In a continuous process however, the PVA-saturated slurry-liquid could be recycled, essentially eliminating such loss. Solubility of the metal salt in the slurry-liquid is preferably as high as possible, concomitant with low PVA solubility in the liquid. This is because the ion-exchange process may proceed faster when more of the salt is in solution. However, it has been found that quite low solubilities can provide the necessary conduit for the process to work, for instance as low as 5 weight percent.

Suitable slurry-liquids are water, lower alkanols, ketones and lower alkyl esters, particularly acetates. PVAs will have varying solubility in any particular liquid depending on the degree of hydrolysis, whether a copolymer or not, and what particular comonomer. More crystalline, fully-hydrolyzed homopolymer PVA tends to dissolve more slowly, and to a lesser extent than 'homopolymer' PVA which has been hydrolysed to a lesser extent (which is, in reality, a poly(vinyl alcohol/vinyl acetate) copolymer). In water, for instance, fully-hydrolysed homopolymer PVA is difficult to dissolve under 50 deg. C. While comonomers reduce crystallinity, less polar comonomers will also reduce overall polarity of the polymer as comonomer level increases, so that the polarity of the particular slurry-liquid will also be important. It is within the skill of the artisan to judge which are suitable slurry-liquids for a given PVA type. Process variables are relatively simple, and trial and error will readily determine which are better liquids. Preferred slurry-liquids are water, methanol, ethanol, acetone, methyl acetate, or mixtures of these. Mixtures of methanol with up to 20 weight percent water, for instance, has been found particularly suitable, though no systematic optimization has been carried out.

A range of solid PVA/slurry-liquid ratios are possible in the process of the invention. From about 0.05/1 to 0.95/1 ratio is possible, but 0.2/1 to 0.8/1 is preferred, and 0.3/1 to 0.6/1 is most preferred. The less liquid, the more efficient the process from a handling and solids drying point of view.

The amount of IER required will depend on the amount of salt present. Generally, excess IER, based on the number of moles of acid equivalent available in the IER relative to the number of moles of base equivalent in the salt should be employed. Other factors will be involved, and lower excesses will be possible the more efficient the ion exchange. Exchange is conveniently achieved by agitating the slurry/IER mix for a period of from between about 5 minutes to an hour, at temperatures ranging from room temperature to about 50 deg. C. Typically, in small scale experiments, a half-hour agitation by stirring at about 24 deg. C. was found satisfactory. Preferably, agitation times are as short as possible concomitant with the degree of ash removal desired. Preferably, times less than half an hour, at ambient temperatures (20–30 deg. C.) are desirable.

Once exchange has taken place, the metal ion-containing IER is separated from the PVA. This is achieved using well-known differential particle separation techniques. Separation may be based on either particle size or particle weight.

For separation based on size to be achieved, the PVA particles must have a substantially different average size from that of the IER (or more precisely, the IER after it has undergone the necessary exchange). The PVA slurry/IER mix itself may be separated into parts; one containing PVA particles free of IER, and the other the IER particles, possibly containing a small amount of PVA, using filtration techniques, without slurry-liquid removal. Alternatively, and preferably, the slurry-liquid is first removed from the PVA/IER particle mix, the mixed particles dried, and the dried mixed particles separated to provide an IER-free PVA portion, by sieving. This technique was tested extensively.

The efficiency of such separation will depend on a large number of factors. Most important will be the size differential between, and size distribution of, the PVA particles and the IER particles. The narrower the size distributions, in general, the less size differential will be necessary for efficient separation. It is not critical whether the PVA or the IER has the larger particle size. Of course, for a given PVA product and process, the size and size distribution may be essentially fixed, and the availability of suitable particle size IER will become the key factor. The efficiency of the separation process for a particular PVA may be improved over that achievable by commercially available IERs by tailoring production of specially suitable particle size/distribution IERs. There is however, a considerable range of IERs available.

Alternatively, it may be possible to change process parameters in the production of the PVA to change particle size and distribution. In the examples included in this application, efficiency was limited to that possible with the PVA at hand, and availability of commercial IERs. No attempt was made to alter the PVA, or have IERs specifically designed.

Separation must be such that the PVA recovered is 'uncontaminated' with any IER. It is not essential that the separated IER be completely free of PVA however. Nevertheless, any PVA remaining with the IER represents a PVA yield loss. The IER should therefore be with the IER represents a PVA yield loss. The IER should therefore be removed from a substantial portion of the PVA, since this portion of the PVA prepresents the yield. By substantial portion it is meant that at least 50 percent of the PVA can be freed of IER. This however is least desirable, and it is highly desirable that more than 95 percent of the PVA is recovered free of IER, and full recovery is the ideal.

For the PVA to remain uncontaminated, it is clear that, while there can be particle size overlap, if the IER has the smaller particle size and is to be allowed to pass through a sieve to separate, then its largest particles must be smaller than the sieve holes. Conversely, if the IER has the larger size particles, its smallest particles must be retained by the screen.

The phrase 'substantially different' referring to particle size is not readily numerically definable, since size distribution functions would be involved. As used in this disclosure, it means that the size and distribution of the PVA and IER is sufficiently different that sieving is capable of producing an IER-free PVA fraction, and that a substantial portion as defined above (at least 50 weight percent of the original PVA) is recovered in that fraction.

Separation may also be achieved utilizing difference in weight of the PVA and IER particles, using fluidized-bed techniques. Difference in weight of the two types of particles may result from either difference in density of similar sized PVA and IER particles or difference in size of similar density PVA and IER particles (or some combination of the two). Of course, when difference in size is used to achieve difference in weight, it is the difference in weight and not size difference which is utilized for separation. Optimization of this technique is possible, by using different IERs or by controlling the nature of the PVA.

Variation in density of different PVAs may result from crystallinity differences between a homopolymer and a copolymer. Some PVAs may also be quite porous. Varying porosity may be used to provide some control on the weight of PVA particles.

The phrase 'substantially different' in reference to particle weight is defined in an analogous way to the functional definition used in relation to separation based on size, noted above.

EXAMPLES

Grades of PVA and IER used

In the following examples, two grades of PVA were used. The grades were not specially prepared to be adaptable to separation techniques based on size or weight, and had a significant size distribution. In an attempt to narrow the size distribution to enable better separation from the IER based on size, one grade was further sieved to obtain particles between two mesh sizes. Two sub-grades were made, one with small particle size between 100 and 200 mesh, and the other with large particle size between 50 and 100 mesh. In most examples, the PVA had smaller particles that the IER. In those cases a relatively large particle size IER was employed. One set of examples used the above large particle size PVA (i.e. 50–100 mesh) and small particle size IER (200–325 mesh).

The IERs used varied in composition. Except for one grade, all had a large average particle size, (larger than 50 mesh). The small size IER was the 200–325 mesh grade referred to above. IERs can absorb a considerable amount of water, and it is important when describing particle size and ion equivalent to specify the basis, dry or wet.

The PVAs used are shown in Table 1a below, and the IERs in Table 1b.

TABLE 1a

PVAs Used

| Code | Composition | % Hydrol. | Mesh | Solution(1) viscosity (centipoise) | pH | Ash(wt. %) (2) |
|---|---|---|---|---|---|---|
| PA | Homopolymer | >99 | — | 27–33 | 5–7 | .53 |
| PB | Sieved PA | >99 | 100–200 | " | " | .48 |
| PC | Copolymer(3) | >98 | — | 12–15 | " | .56 |
| PD | Sieved PA | >99 | 50–100 | 27–33 | " | .47 |

(1)Measured by Hoeppler falling ball method, using 4 wt. % solids aqueous solution at 20 deg. C., bone-dry basis.
(2)Weight percent Ash based on titration of water slurry with hydrochloric acid solution. A 4–8 weight % slurry is stirred for 5 minutes and titrated with 0.2–0.02 N.HCl. Percent Ash is calculated as Na2O.
(3)Copolymer with 5 wt. % methyl methacrylate.
Mesh is U.S. Standard Mesh.

TABLE 1b

IERs Used

| Code | Composition | IEC (meq/g) | IEC (meq/ml) | Wet Density (g/ml) | Wet Mesh | Sieve to (1) |
|---|---|---|---|---|---|---|
| IA | S/DVB-sulf. | 4.6 | 1.7 | .77 | 20–50 | <40 |
| IB | MAA/DVB | 10 | 3.5 | .69 | 16–50 | <40 |
| IC | S/DVB-sulf. | 3.3 | 1.0 | — | — | <40 |
| ID | S/DVB-sulf. | 4.6 | 1.8 | .80 | 16–50 | <40 |
| IE | AA/DVB | 10.5 | 3.5 | .75 | 16–50 | <40 |
| IF | S/8% DVB-sulf. | 5 | 1.9 | .85 | 16–50 | <40 |
| IG | S/20% DVB-sulf. | — | 1.7 | .80 | 16–40 | <40 |
| IH | Cell-sulf.pr. | — | 1.2 | — | 150–250(2) | <40 |

TABLE 1b-continued

| | | IERs Used | | | |
|---|---|---|---|---|---|
| Code | Composition | IEC (meq/g) | IEC (meq/ml) | Wet Density (g/ml) | Wet Mesh | Sieve to (1) |
| II | S/DVB-sulf. | 4.6 | 1.7 | .77 | 20-50 | None |
| IJ | S/12% DVB-sulf. | 5.1 | 2.2 | | | 200-235 |

S = styrene; AA = acrylic acid; DVB = divinyl benzene; sulf. = sulfonated; sulf.pr = sulfopropyl groups; IEC is Ion-exchange capacity based on dry weight (milliequivalents/gram), and wet volume (milliequivalents/milliliter.)
(1)Sieved to 40 means material retained on 40 mesh screen.
200-325 means material passed through 200 mesh screen and retained by 325 mesh screen.
(2)Size in microns, dry.
Wet density and Wet Mesh refer to the IER when it has absorbed equilibrium amount of water.
IA, AMBERLITE IR-120(H)C.P, Rohm and Haas.
IB, AMBERLITE IRC-50(H), Rohm and Haas.
IC, AMBERLYST XN-1010, Rohm and Haas.
ID, AMBERLYST 15(H), Rohm and Haas.
IE, AMBERLITE IRC-76(H), Rohm and Haas.
IF, AMBERLITE IR-120Plus(H) Rohm and Haas.
IG, AMBERLITE 200C(H)(16/40) Rohm and Haas.
IH, INDION SP Phoenix Chemicals.
II, As IA, but not sieved.
IJ, DOWEX 50W-X12. Dow Chemical.

EXAMPLES C1 TO C8 AND 1 TO 40

Examples 1–40 were carried out in exactly the same way as described below. They differ in the particular PVA used, and sometimes the amount, the particular IER used and the amount, and the slurry-liquid used. Examples C1–C8 are controls, where no IER was used. The Examples are grouped in several series, each series corresponding to different PVA/different solvent combinations. Within a series, which usually included a control without IER, different IERs were used. The series are separated with a dashed line in the tables.

PVA and IER were mixed with slurry-liquid. Typically, the mixture had about a 30/1 to 10/1 PVA/IER weight ratio, and a 2/1 to 3/1 total liquid to solid ratio.

The slurry mix was stirred at room temperature (~24 deg. C.) for half an hour, followed by vacuum filtration on a fritted glass filter. Filtrate solution weights and wet solid weights were measured. The wet solid was dried in a vacuum oven with nitrogen purge overnight at room temperature then for 4 hours at 80 deg. C. and the dry weight measured. The solid was then sieved using a 100 mesh screen unless otherwise indicated. The IER was either retained completely, together with a varying portion of PVA or passed through completely with a small, varying portion of PVA, depending on the relative size of PVA and IER. The bulk of the PVA passed through or was retained respectively, and was uncontaminated with IER. It was weighed, and an ash analysis carried out.

TABLE 2

ASH REDUCTION USING IER SLURRY TECHNIQUE: SIEVE SEPARATION

| # | PVA wt.(g) code | IER wt.(g) code | Slurry Liquid wt(g) | Filtrate wt(g) | Solid Wt(g) Wet | Solid Wt(g) Dry | Product wt(g) | Ash wt % |
|---|---|---|---|---|---|---|---|---|
| C1 | 30 PA | None | 70 MeOH | 51.2 | 43.5 | 28.8 | 18.1 | 0.50 |
| 1 | " | 1.0 IA | " | 51.6 | 45.2 | 29.2 | 15.9 | 0.35 |
| 2 | " | 1.5 IA | " | 50.9 | 46.6 | 29.7 | 18.0 | 0.32 |
| 3 | " | 2.0 IA | " | 50.8 | 47.3 | 29.8 | 17.6 | 0.27 |
| 4 | " | 3.0 IA | " | 50.7 | 47.6 | 30.5 | 17.3 | 0.26 |
| 5 | " | 1.5 IB | " | 50.6 | 46.3 | 29.4 | 17.7 | 0.36 |
| 6 | " | 3.0 IB | " | 49.2 | 49.3 | 30.3 | 17.6 | 0.29 |
| 7 | " | 3.0 IC | " | 47.4 | 49.2 | 31.6 | 16.9 | 0.04 |
| 8 | " | 3.0 ID | " | 47.6 | 49.0 | 32.0 | 16.8 | 0.09 |
| 9 | " | 3.0 IE | " | 48.9 | 49.6 | 30.6 | 17.7 | 0.28 |
| 10 | " | 3.0 IF | " | 48.9 | 50.4 | 30.8 | 17.9 | 0.28 |
| 11 | " | 3.0 IG | " | 47.3 | 50.5 | 31.0 | 19.0 | 0.33 |
| 12 | " | 3.0 IH | " | 46.5 | 51.2 | 29.4 | 18.6 | 0.41 |
| 13 | " | 1.5 IB | 64.8 MeOH 5.2 H2O | 36.9 | 58.5 | 29.9 | 17.0 | 0.23 |
| 14 | " | 3.0 IB | 64.8 MeOH 5.2 H2O | 37.0 | 61.7 | 30.4 | 16.6 | 0.19 |
| 15 | " | 1.5 IC | 64.8 MeOH 5.2 H2O | 37.5 | 56.7 | 30.1 | 17.0 | 0.08 |
| 16 | " | 3.0 IC | 64.8 MeOH 5.2 H2O | 35.1 | 61.4 | 31.3 | 17.6 | 0.03 |
| 17 | " | 1.5 ID | 64.8 MeOH 5.2 H2O | 43.3 | 51.9 | 30.5 | 16.7 | 0.05 |
| 18 | " | 3.0 ID | 64.8 MeOH 5.2 H2O | 36.9 | 58.8 | 31.5 | 16.2 | 0.03 |
| 19 | " | 1.5 IE | 64.8 MeOH 5.2 H2O | 37.5 | 57.9 | 29.2 | 17.2 | 0.19 |
| 20 | " | 3.0 IE | 64.8 MeOH 5.2 H2O | 37.9 | 63.3 | 30.4 | 16.3 | 0.11 |
| 21 | " | 1.5 IF | 64.8 MeOH 5.2 H2O | 36.5 | 58.0 | 30.1 | 17.9 | 0.15 |
| 22 | " | 3.0 IF | 64.8 MeOH 5.2 H2O | 37.2 | 61.3 | 31.2 | 16.8 | 0.06 |

TABLE 2-continued
ASH REDUCTION USING IER SLURRY TECHNIQUE: SIEVE SEPARATION

| # | PVA wt.(g) code | IER wt.(g) code | Slurry Liquid wt(g) | Filtrate wt(g) | Solid Wt(g) Wet | Solid Wt(g) Dry | Product wt(g) | Ash wt % |
|---|---|---|---|---|---|---|---|---|
| 23 | " | 1.5 IG | 64.8 MeOH 5.2 H2O | 38.3 | 56.3 | 29.6 | 18.1 | 0.13 |
| 24 | " | 3.0 IG | 64.8 MeOH 5.2 H2O | 37.5 | 60.1 | 30.0 | 17.3 | 0.04 |
| 25 | " | 1.5 IH | 64.8 MeOH 5.2 H2O | 37.3 | 57.2 | 29.0 | 17.8 | 0.31 |
| 26 | " | 3.0 IH | 64.8 MeOH 5.2 H2O | 36.5 | 61.2 | 29.0 | 15.4 | 0.28 |
| C2 | " | None | 35 MeOH 35 MeAc | 48.3 | 43.2 | 29.3 | 18.3 | 0.51 |
| 27 | " | 1.5 IA | 35 MeOH 35 MeAc | 48.4 | 44.9 | 30.2 | 18.1 | 0.23 |
| 28 | " | 3.0 IA | 35 MeOH 35 MeAc | 45.4 | 48.5 | 31.2 | 18.1 | 0.12 |
| C3 | 30 PB | None | 70 MeOH | 37.9 | 55.3 | 29.4 | 28.4 | 0.44 |
| 29 | " | 0.5 IC | " | 41.2 | 51.8 | 29.7 | 29.1 | 0.33 |
| 30 | " | 1.0 IC | " | 41.8 | 52.0 | 30.0 | 28.9 | 0.31 |
| 31 | " | 2.0 IC | " | 41.6 | 54.1 | 31.3 | 29.2 | 0.29 |
| 32 | " | 2.0 ID | " | 43.4 | 53.7 | 31.8 | 29.4 | 0.32 |
| C4 | 20 PA | None | 30 MeOH | 13.4 | 33.1 | 19.0* | 9.38 | 0.48 |
| 33 | " | 0.7 II | " | 3.2 | 44.3 | 19.1* | 9.0 | 0.30 |
| C5 | 20 PA | None | 43.2 MeOH 3.5 H2O | 27.6 | 34.0 | 19.1 | 12.4 | 0.37 |
| C6 | " | None | 43.2 MeOH 3.5 H2O | 26.5 | 36.8 | 19.4* | 9.4 | 0.32 |
| 34 | " | .32 II | 43.2 MeOH 3.5 H2O | 26.9 | 36.1 | 19.8 | 11.4 | 0.23 |
| 35 | " | .70 II | 43.2 MeOH 3.5 H2O | 27.8 | 35.3 | 19.3* | 7.8 | 0.18 |
| 36 | " | 1.28 II | 43.2 MeOH 3.5 H2O | 22.4 | 41.2 | 20.0 | 11.1 | 0.07 |
| 37 | " | 2.55 II | 43.2 MeOH 3.5 H2O | 23.4 | 42.1 | 21.3 | 11.6 | 0.04 |
| C7 | 20 PC | None | 43.2 MeOH 3.5 H2O | 23.5 | 39.8 | 18.6 | 10.4 | 0.37 |
| 38 | " | .70 II | " | 22.7 | 39.5 | 18.9 | 10.8 | 0.17 |
| C8 | 30 PD | None | 70 MeOH | 47.2 | 46.7 | 29.4 | 19.9 | 0.42 |
| 39 | " | 1.5 IJ | " | 47.4 | 48.6 | 30.5# | 14.6 | 0.09 |
| 40 | " | 3.0 IJ | " | 50.1 | 50.3 | 32.2 | 26.4 | 0.06 |

PVA code or IER code refers to codes in Table 1a and 1b.
Product is PVA product weight.
Filtrate is filtrate solution weight.
MeOH = Methanol, MeAc = Methyl acetate.
*5 grams of dry sample retained for further experiments before seiving.
140 Mesh sieve used.
Note: C8, 39 and 40 had smaller size IER than PVA. In all other examples, IER had larger size IER than PVA.

Examination of the data indicates that some IERs are more effective than others, and that increasing the amount of IER in the slurry reduces residual ash content. In some examples IERs designated IC and ID are particularly effective, reducing ash to levels as low as 0.03 weight percent. Some differences can be seen for different slurry-liquids. Thus methanol/water and methanol/methyl acetate mixes show somewhat lower ash for a corresponding IER.

In general, while complete separation of the IER was always achieved, some PVA was always retained (or transmitted) on (or through) the sieve with the IER. This would represent a yield loss in recovered PVA. Some improvement is seen in examples 29-32, where the PVA used was sieved to narrow its particle size distribution. The relatively low yields are probably the result of inadequately narrow particle size distribution. Further optimization could be achieved by tailoring the IER further, and possibly by altering process variables in PVA production. It will be seen below, that for the IERs and PVAs tested, fluidized bed techniques give a somewhat better separation. No extensive optimization of solvent, IER, slurry composition and stirring time was carried out. Yet in several instances, a remarkably low level of ash was achieved, and in all instances a significant lowering was achieved.

EXAMPLES C9, C10, AND 41–42

Small, approximately 5 gram PVA samples retained from the previous experiments (those indicated by an asterisk in Table 2), after ion exchange and drying but before sieving, were subjected to a fluidized bed technique to test an alternate means of separation of particles to sieving. All these samples had larger size IER than PVA. The weighed samples were placed in a 30 ml., 30 mm. diameter fritted funnel whose stem was attached to a nitrogen line. The funnel was placed over a large glass dish. Nitrogen flow was started, fluidizing the particles. Flow rate was increased until the colored IER could be seen reaching half-way up the funnel, and the PVA was overflowing from the top, and dropping into the underlying dish. No IER was carrier over the funnel into the dish. The results of the separation are shown in Table 3. Ash contents of the PVA of the corresponding sieved samples are also shown.

It can be seen from the Table that fluidization allowed a greater separation of PVA from the IER than most of the sieving examples, allowing a greater product yield. The ash content, not surprisingly, was comparable to that achieved when separated by sieving. Any difference presumably reflects slight differences in ash content associated with the particle size variation in the PVA, and is not significant.

TABLE 3

ASH REDUCTION USING IER SLURRY TECHNIQUE: FLUIDIZED BED SEPARATION

| # | Source (# in Table 2) | Weight (g) | Funnel Separation Retained, wt(g) color | Fluidized wt(g) color | Ash wt. % |
|---|---|---|---|---|---|
| C9 (C4 | C4 | 5.2 | 0.09 white PVA | 4.7 white PVA | 0.48 0.48) |
| 41 (33 | 33 | 5.3 | 0.48 colored IER + white PVA | 4.2 white PVA | 0.36 0.30) |
| C10 (C6 | C6 | 5.2 | 0.16 white PVA | 4.6 white PVA | 0.32 0.32) |
| 42 (35 | 35 | 5.2 | 0.6 colored IER + white PVA | 4.2 white PVA | 0.22 0.18) |

I claim:

1. A process for removal of residual metal salts from poly(vinyl alcohol) polymer, comprising the steps of:
    a) forming a slurry of poly(vinyl alcohol) polymer particles and a slurry-liquid;
    b) adding a particulate cationic ion-exchange resin to the slurry, wherein the average particulate size, or particulate weight of the ion-exchange resin is substantially different from the average particulate size or weight of the poly(vinyl alcohol) polymer;
    c) agitating the combined slurry and ion-exchange resin mixture for a time sufficient to effect at least 20 ion anion exchange;
    d) optionally removing the slurry-liquid and drying the solid particle mix remaining, and
    e) removing completely the particulate ion-exchange resin from a substantial portion of the particulate poly(vinyl alcohol) polymer by differential particle separation means, to provide an ion-exchange free poly(vinyl alcohol) portion having reduced metal salt content.

2. The process of claim 1 wherein step d) is carried out, and step e) is achieved by use of a sieve.

3. The process of claim 2 wherein removal of the ion-exchange resin is achieved by its retention on a sieve.

4. The process of claim 2 wherein removal of the ion-exchange resin is achieved by its transmission through a sieve.

5. The process of claim 1 wherein removal of the particulate ion-exchange resin from the particulate poly(vinyl alcohol) polymer is achieved by use of a fluidized bed technique.

6. The process of claim 1, 2 or 5 wherein the slurry-liquid is selected from the group consisting of water, methanol, a mixture of methanol and water, and a mixture of methanol and methyl acetate.

7. The process of claim 1 wherein the level of ash remaining in the poly(vinyl alcohol) polymer is less than 0.1 weight percent.

* * * * *